May 22, 1956
C. KLINGENS
2,746,500
JUICE TROUGH ASSEMBLY FOR A SLICING
MACHINE HAVING A ROTATABLE KNIFE
Filed Dec. 22, 1952
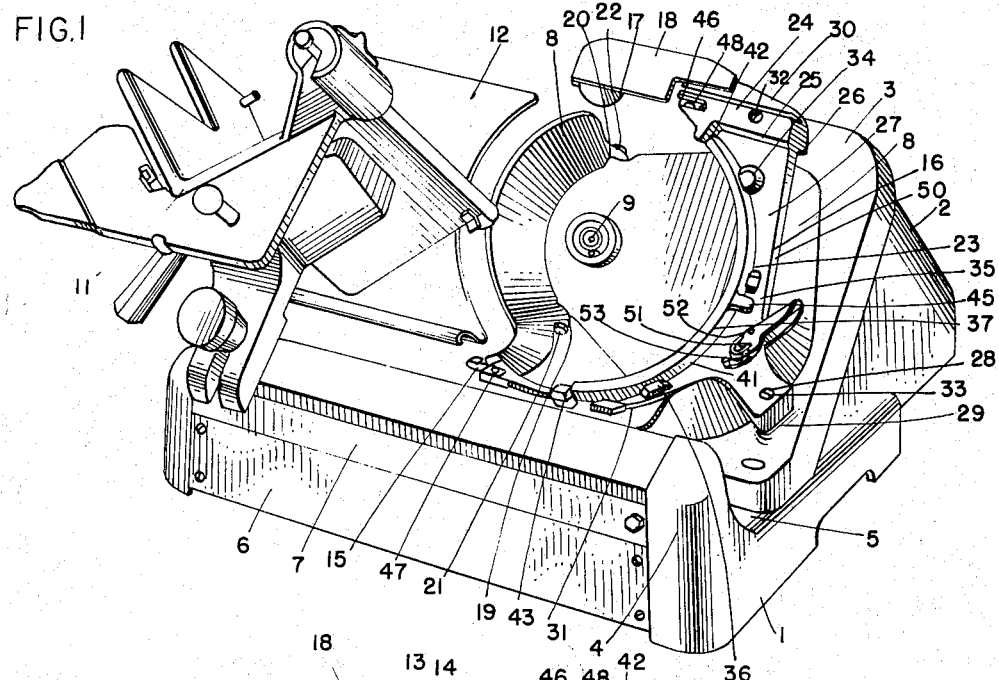
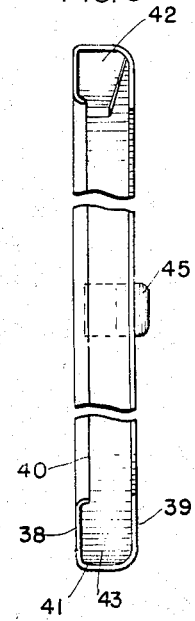
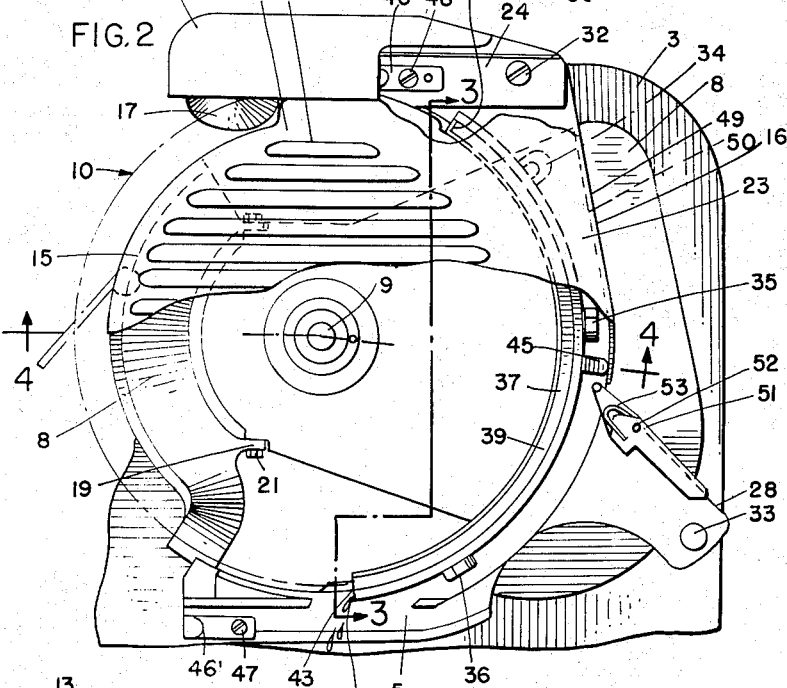
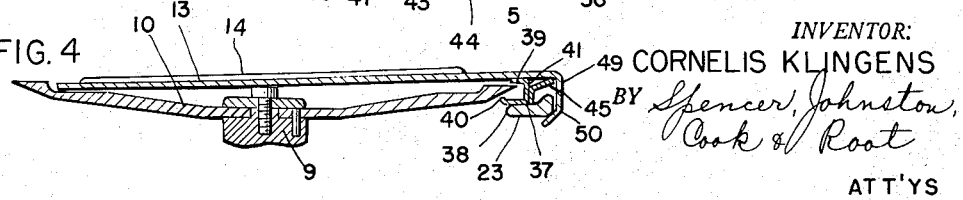
INVENTOR:
CORNELIS KLINGENS
BY Spencer, Johnston,
Cook & Root
ATT'YS

United States Patent Office 2,746,500
Patented May 22, 1956

2,746,500

JUICE TROUGH ASSEMBLY FOR A SLICING MACHINE HAVING A ROTATABLE KNIFE

Cornelis Klingens, La Porte, Ind., assignor to U. S. Slicing Machine Company, Inc., La Porte, Ind., a corporation of Indiana Application December 22, 1952, Serial No. 327,377

2 Claims. (Cl. 146—102)

This invention relates to a juice trough assembly for slicing machines having a food table conventionally in the form of a V-shaped trough and wherein slices are cut as the food substance is reciprocated past a slicing knife. For purposes of illustration, the juice trough assembly constituting the present invention has been shown herein as applied to that type of a slicing machine having a rotatable knife which is inclined to the vertical and a food trough which is also inclined to the vertical and perpendicular to the cutting plane of the slicing knife, whereby material to be cut may be fed by gravity to the cutting plane of the knife.

An important object of the invention is the provision of a new and improved assembly for receiving juice and particles of the substance that is sliced, thereby preventing the accumulation of such juices and particles within the enclosed of the slicing machine.

A further object of the invention is the provision of a juice and particle trough which interrupts the centrifugal force of juices and particles as discharged by a rotating knife blade and collects the debris at a point convenient for removal.

A further object of the invention is the provision of a juice catcher element that also serves in the capacity as a finger guard and consequently serves as a safety feature.

Another object of the invention is the provision of a handle that permits ready removal of the juice catcher without the necessity of placing the operator's fingers in close proximity to the knife edge.

A further object of the invention is the provision of a guide spring that positions the juice trough in its operative site and with respect to the knife.

Other objects and advantages will be apparent throughout the specification which follows:

The accompanying drawings illustrate a certain selected embodiment of the invention and the views therein are as follows:

Figure 1 is a detailed perspective view of an improved slicing machine showing the rear and right-hand sides thereof (from the operator's stance) together with the juice trough assembly;

Figure 2 is a detailed elevational view showing the knife box assembly and the juice trough assembly with the knife center plate in position but broken away in part;

Figure 3 is a detailed sectional view of the juice trough assembly substantially on the plane of line 3—3 of Figure 2 shown with the knife and center plate removed; and Figure 4 is a detailed sectional view taken substantially on the plane of line 4—4 of Figure 2 showing the positioning of the assembly with respect to the knife center plate and the knife.

The invention herein disclosed is applicable to any type of slicing machine for slicing foodstuffs but is shown specifically as relating to a gravity feed machine. Such a machine is shown in the United States application of Klingens et al., Serial No. 747,994, filed May 14, 1947, now Letters Patent 2,563,120.

The slicing machine for which the present invention is designed comprises a supporting structure or main frame 1 including an upstanding housing or casing part 2 having a top sloping portion 3. The frame has an upwardly projecting portion 4 providing a depression or channel 5 lying between such upper portion and the sloping portion 3 of the casing. Panels 6 and 7 are removably mounted upon the upward portion 4. A knife box 8 is operatively supported on the top of sloping portion 3 and supports the driving mechanism 9 for a rotatably mounted slicing knife 10, which is inclined from the vertical. A food table 11 is positioned on the upward portion 4 of the frame 1, and, as shown in Figure 1, is in a non-cutting position as is the case preparatory to slicing. A plate 12 is provided to gauge the thickness of slices to be cut from the substance by the slicing knife 10.

Superimposed over the knife, as shown in Figure 2, is a knife center plate 13 carrying substance positioning ridges 14 and having a circular portion 15 that corresponds to the contour of the gauge plate and the knife. Opposite the circular portion 15, the gauge plate is irregular in shape and cooperates with and assumes substantially the contour of the casting 16. A knife sharpening mechanism 17 is arranged within a knife sharpener casing 18 which is partly recessed in the knife box 8. The knife box is positioned in part upon the sloping portion 3 of the casing 2 at 19 and 20 by means of machine bolts 21 and 22.

The casting 16 circumscribes the knife box 8 in part as at 23 and terminates at its upper end in an enlarged part 24. The top portion 24, projecting above and below the surface of the casting 16, forms an upper recess 25 and a lower recess 26 with the main body portion 27. The main body 27 constitutes the entire circular part of the casting 16 identified as 23. The casting 16 has a rearward extension 28 carrying a foot 29. The casting is positioned upon the sloping portion 3 of the casing 2 by means of foot 29, a U-shaped reinforcing rib as indicated by dotted lines at 30 that is part of the top part 24, and a foot 31 indicated at the bottom of the main body 27 of the casting 16, and is mounted thereon by conventional means such as machine screws 32 and 33. A trough element 37 conforming to the contour of the main body 23 of the casting 16 is positioned thereon by means of bosses 34, 35 and 36. The trough is somewhat U-shaped in cross-section, having legs 38 and 39. Leg 38 is positioned upon main body 23, and terminates at its outermost edge in an upwardly projecting lip 40 that lies beneath the knife 10. Legs 38 and 39 are connected by a web 41. As can be seen from Figure 4, leg 39 lies beneath and in part supports the knife center plate 13. The upper end of the trough terminates in an end cap 42 that is soldered or otherwise secured to the trough in assembly and a water-tight seam accordingly formed. The lower end 43 of the trough is opened so as to permit the accumulation of juices, as indicated at 44, to discharge from the juice trough into a container (not shown) lodged in the recess 5, or to discharge directly into the recess. A guide spring 45 is formed integral with or secured to the trough 37 between the ends thereof preferably upon web 41 of the trough. This spring is fashioned of blue-tempered clock spring steel and abuts the casting 16 at main body 27 to position the trough. In addition, when for reasons previously enumerated, it is desired to remove the knife center plate, it is possible to remove the juice trough 37 by means of the guide spring 45 and in this capacity the spring acts as a handle. Since the knife 10 is extremely hazardous because of its weight and sharpness, a handle feature of this variety is desirable as a precautionary measure. It can be seen that when the knife center plate is removed, the edge of the knife is covered by leg 39, so that inadvertent contact with the knife edge is minimized.

The knife center plate is positioned upon and over the casting 16 by means of slots in the peripheral portions of the plate for adaptation with hooks 46 and 46' secured to the casting by screw means at 47 and 48 respectively. The center plate is downwardly turned to form a flange 49 that abuts the casting edge 50. The knife center plate locking mechanism 51 pivotally mounted at 52 on the casting arm 28, has a spring member 53 which engages the flange 49 to releasably lock the plate in the position described.

The juice trough assembly constituting this invention as indicated promotes safety in the care and maintenance of the machine and embodies means for enhancing the cleanliness of the slicing machine upon which the assembly is employed. The slicing knife, being a hazardous element, such assembly promotes the safety of the operator in cleaning and adjusting operations, and enhances the sanitary conditions of the machine as well.

Other changes may be made in the form, construction, and arrangement of the parts without departing from the spirit of the invention or sacrificing any of its advantages and the right is hereby reserved to make all such changes as fall clearly within the scope of the following claims.

The invention that is claimed is as follows:

1. In a slicing machine having a base supporting a rotatable knife with an integral peripheral flange and a cutting edge thereon, apparatus for guarding the cutting edge of the knife and for catching juice and scraps therefrom, said apparatus comprising a casting mounted on the base and having an arcuate edge portion positioned adjacent to the cutting edge of the knife and circumscribing a substantial non-cutting arc thereof, a center plate positioned to cover the front face and edge of the knife in the non-cutting arc and having an arcuate edge in a recessed position adjacent to the flange on the knife in a portion of the remaining arc, and an arcuate juice catcher extending circumferentially about a portion of the knife beneath said center plate and being supported by the arcuate edge of the casting, said juice catcher having a U-shaped cross section with opposed spaced legs extending radially inwardly on each side of the cutting edge of the knife, said juice catcher having a guide spring extending therefrom for positioning the juice catcher on the casting, said guide spring extending upwardly and radially outwardly thereby further serving as a handle to provide a convenient and safe means for detaching the juice catcher from the slicing machine.

2. In a slicing machine having a base supporting a rotatable knife with a circumferential cutting edge thereon, apparatus for guarding the knife and for catching juice and scraps therefrom, said apparatus comprising a casting having an arcuate edge portion and having a plurality of bossed portions spaced along the arcuate edge, said casting being mounted on the base with the arcuate edge in close spaced relation to the cutting edge of the knife, and an arcuate juice catcher supported by said arcuate edge portion and positioned by the bossed portions of the casting and extending circumferentially about a portion of the knife, said juice catcher having a U-shaped cross section with two legs extending radially inwardly on each side of the cutting edge of the knife, said juice catcher being provided with a guide spring extending therefrom and detachably associating the juice catcher about the cutting edge of the knife and to provide a convenient handle to permit safe removal of the juice catcher from the vicinity of the knife.

References Cited in the file of this patent
UNITED STATES PATENTS

| | | |
|---|---|---|
| 1,044,895 | Luschka | Nov. 19, 1912 |
| 2,008,822 | Freudenberg | July 23, 1935 |
| 2,563,120 | Klingens et al. | Aug. 7, 1951 |
| 2,598,740 | Zimmerman | June 3, 1952 |